United States Patent
Shim

(10) Patent No.: US 6,609,107 B1
(45) Date of Patent: Aug. 19, 2003

(54) DUTY-FREE ARTICLE SHOPPING MALL OPERATING METHOD ON COMPUTER NETWORK AND SYSTEM USING THE SAME

(76) Inventor: Eung Moon Shim, No. 301, Green Park Town, 566-13 Shimgokbon-dong, Sosa-gu, Buchon-shi, Kyounggi-do (KR)

(*) Notice: Subject to any disclaimer, the term of this patent is extended or adjusted under 35 U.S.C. 154(b) by 0 days.

(21) Appl. No.: 09/524,361

(22) Filed: Mar. 14, 2000

(30) Foreign Application Priority Data

Dec. 29, 1999 (KR) .......................................... 1999-64895
Feb. 8, 2000 (KR) .......................................... 2000-5823

(51) Int. Cl.[7] .............................................. G06F 17/60
(52) U.S. Cl. ........................................................ 705/26
(58) Field of Search ............................. 705/26, 27, 19, 705/31, 77

(56) References Cited

U.S. PATENT DOCUMENTS

| | | |
|---|---|---|
| 5,710,887 A | 1/1998 | Chelliah et al. |
| 5,890,137 A | 3/1999 | Koreeda ........................ 705/26 |
| 5,960,411 A | 9/1999 | Hartman et al. ............... 705/26 |

FOREIGN PATENT DOCUMENTS

DE    4443018    * 6/1996

OTHER PUBLICATIONS

Taylor, Roger; Internet Duty–Free Company Launched; Financial Times; London; p. 5, Sep. 10, 1999.*
Duty Free Zone, Com Breaks New Ground in International e–Commerce; PR Newswire, Sep. 9, 1999.*

* cited by examiner

Primary Examiner—F. J. Bartuska
(74) Attorney, Agent, or Firm—Flynn, Thiel, Boutell & Tanis, P.C.

(57) ABSTRACT

A method and system for operating a duty-free article shopping mall provides only a user whose exit and/or entry is confirmed with services such as order, payment and delivery of duty-free articles via a computer network. The method and system include the steps of introducing information supported by duty-free shops from numerous nations to a client machine, and determining what kind of information is selected by the user; requiring the user to input user information in accordance with a result of the determination, and identifying and confirming the information related to exit and/or entry status of the user and credit information. The method and system provides the selected information when the user is authorized, and provides foreign travelers or the general public with information related to duty-free articles of all the countries of the world. Other useful information and services such as order, payment and delivery of the articles via computer network enable expansion of duty-free article markets and provide convenience for the user.

20 Claims, 2 Drawing Sheets

DUTY-FREE ARTICLE SHOPPING MALL OPERATING METHOD ON COMPUTER NETWORK AND SYSTEM USING THE SAME

BACKGROUND OF THE INVENTION

1. Technical field

The present invention relates to a duty-free article shopping mall operating method and a system using the same for providing a user whose exit and/or entry is confirmed with services such as order, payment and delivery of duty-free articles via computer network.

2. Description of the Prior Art

The number of people having a business trip or enjoying a journey has steadily increased in accordance with globalization and a duty-free article market has been broaden. However it is inconvenient that a client should purchase duty-free articles in a duty-free shop of a departure nation or in an airplane and then carry the articles to a destined country in person in order to purchase the duty-free articles.

Also, resulting from lack of information such as allowance limit of the duty-free articles and customs system of the destined country, various losses and troubles may happen.

And there are disadvantages that the client has difficulty in acquiring information about the duty-free articles of each nation and each airline wastes unnecessary costs and labor forces in accordance with shipment of the articles.

SUMMARY OF THE INVENTION

Therefore, the present invention is designed to overcome such disadvantages and inconvenience. It is an object of the present invention to provide a duty-free article shopping mall operating method and a system using the same for providing foreign travelers or the public with information related to duty-free articles of all the countries of the world and the other useful information and providing services such as order, payment and delivery of the duty-free articles only to a user whose exit and/or entry is confirmed (if the user is a foreigner, entry of the user should be confirmed, while, if the user is a native, exit of the user should be confirmed) via computer network for expansion of duty-free article markets and client's benefit.

In order to achieve the object, the duty-free article shopping mall operating method of the present invention on computer network interconnecting one or more client machine, an information institution for inquiry of exit and entry status of the user and an approval center for credit inquiry with a server of a duty-free article shopping mall site, the operating method comprises the steps of: (a) introducing duty-free article related-information or service information supported by duty-free shops of numerous nations to the client machine connected to the server through the network, and determining what kind of information is selected by the user; (b) requiring the user to input personal information and credit information in case that the user selects information of purchasing the duty-free articles, identifying and confirming the inputted information by comparing with information in server and inquiring the inputted information via the network, and determining whether the user has authorization of purchasing the duty-free articles in accordance with exit and/or entry status and credit status of the user; and (c) providing the user having the authorization of purchasing the duty-free articles with the selected duty-free article-related information and/or the service information.

Also, the step (b) in the present invention comprises the steps of identifying and confirming the inputted personal information by comparing with the registration information in the server, transmitting the identified and confirmed personal information to the information institution for inquiry of exit and/or entry status of the user in case that the user is registered, and comparing the personal information with a list of inbound and/or outbound passengers from the information institution via the network; transmitting the inputted credit information to the approval center for credit inquiry via the network in case that exit and/or entry of the user is confirmed; and allowing the authorized user to reconfirm a list of the ordered articles and to confirm a payment list in accordance with a result of the credit inquiry.

The duty-free article shopping mall operating system on computer network according to the present invention for achieving the object connecting one or more client machine to a server of a duty-free article shopping mall site, wherein the server forms an introduction information database for introducing duty-free article-related information or service information supported by duty-free shops of numerous nations to the client machine through the network and a registration information database for determining whether the user is registered; and wherein the server builds in an application programmed for determining what kind of information is selected by the user, requiring the user to input personal information and credit information in case that the user selects information of purchasing the duty-free articles, identifying and confirming the inputted information by comparing with information in the registration information database and inquiring the inputted information via the network, determining whether the user has authorization of purchasing the duty-free articles in accordance with exit and/or entry status and credit status of the user, and providing the selected duty-free article-related information or service information in case that the user has authorization of purchasing the duty-free articles.

BRIEF DESCRIPTION OF THE DRAWINGS

These and other features, and advantages of the present invention will become better understood with regard to the following description, appended claims, and accompanying drawings. In the drawings:

DETAILED DESCRIPTION OF THE PREFERRED EMBODIMENT

Hereinafter, preferred embodiments of the present invention will be described in detail with reference to the accompanying drawings.

Figure 1:
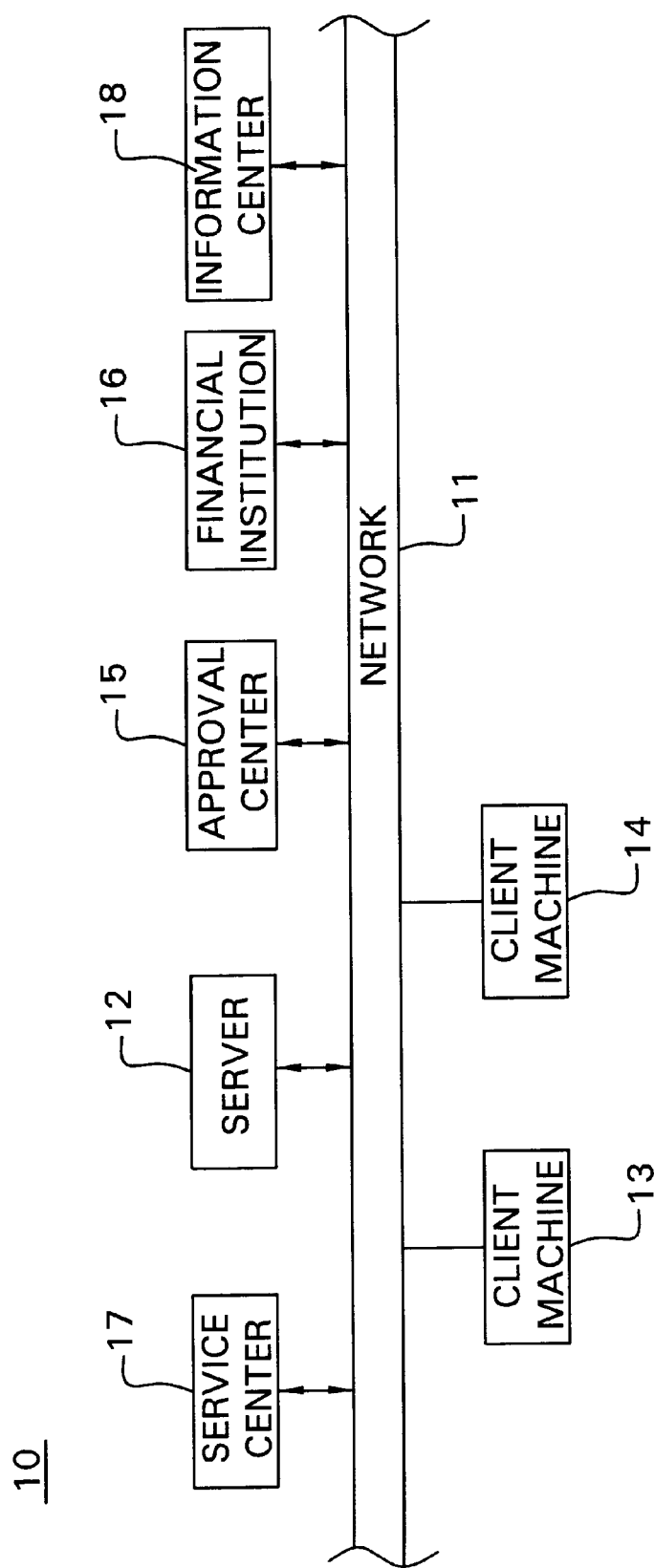
FIG. 1 shows a configuration of a duty-free article shopping mall operating system according to the present invention.
Figure 2:
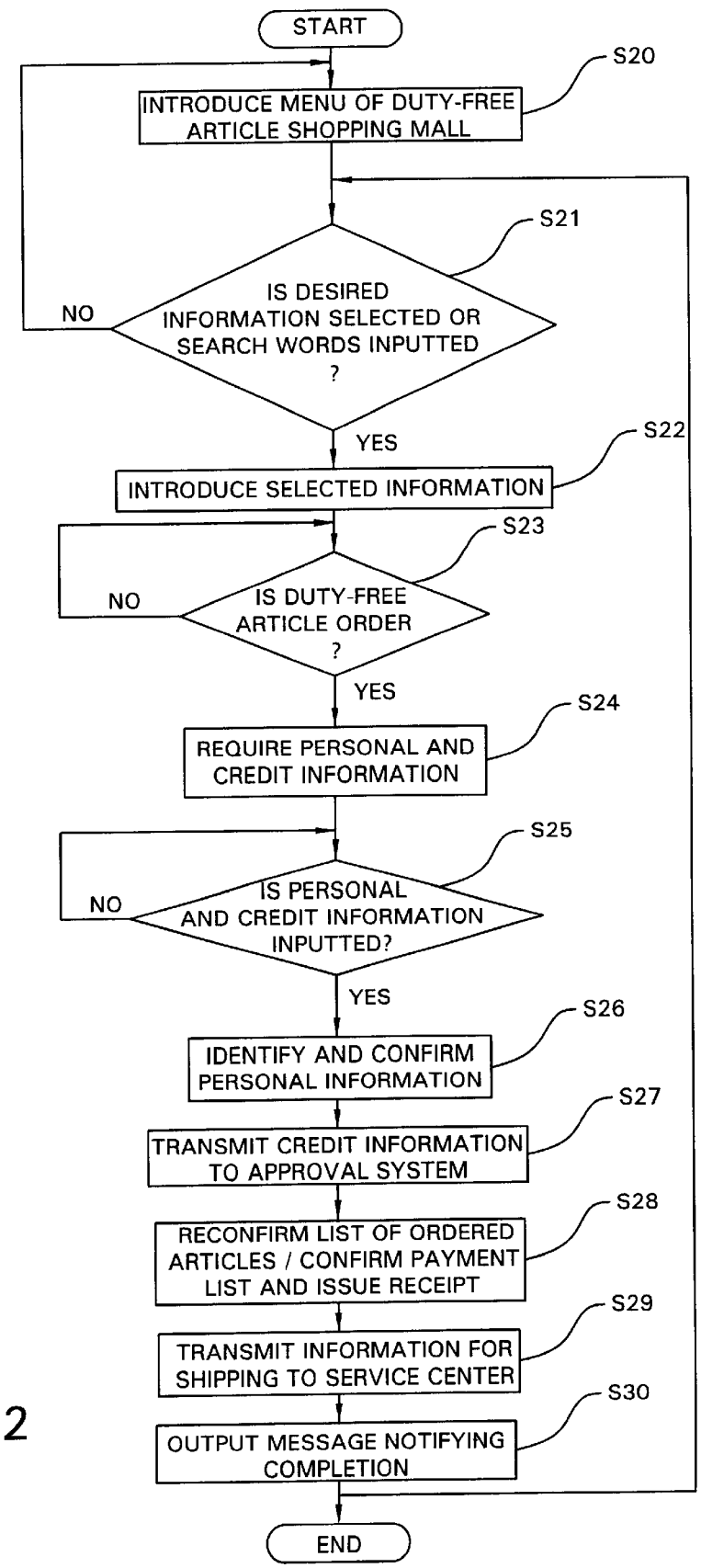
FIG. 2 is a flow chart for illustrating a duty-free article shopping mall operating method according to the present invention.

FIG. 1 shows a configuration of a duty-free article shopping mall operating system according to the present invention and FIG. 2 is a flow chart of a duty-free article shopping mall operating method according to the present invention.

Referring to FIG. 1, numerous client machines 13, 14, a financial institution 16 such as a bank or a credit card company, an information institution 18 for managing a list of inbound or outbound passengers and corresponding information, an approval center 15 such as VAN co. or KFTC(Korea financial telecommunications and clearings institute) and a service center 17 for shipping the articles are interconnected through computer network 11, which is interconnected with many relevant nations of worldwide. For example, in Korea, the information institution 18 may be the Exit and Entry Control Bureau and/or may be a private institution connected to Exit and Entry Control Bureau for providing a list of inbound or outbound passengers and corresponding information.

A server 12 for operating a duty-free article shopping mall site forms an introduction information database in order to introduce duty-free article-related information or service information supported by duty-free shops of numerous nations to the client machines 13, 14 connected with the server through the network 11. The server also forms information required for determining whether a user is registered into a registration information database.

The server 12 builds in an application programmed for determining what kind of information is selected by the user, requiring the user to input personal information and credit information in case that the user selects information of purchasing the duty-free articles, identifying and confirming the inputted information by comparing with information in the registration information database and inquiring the inputted information via the network, determining whether the user has authorization of purchasing the duty-free articles in accordance with exit and/or entry status and credit status of the user, and providing the selected duty-free article-related information or service information in case that the user is authorized.

The application of the server 12 comprises a unit for identifying and confirming the user by comparing the inputted personal information of the user, selecting information of purchasing the duty-free articles, with information in the registration information database, transmitting the personal information of a registered user to the information institution for inquiry of exit and/or entry status, receiving the result of the inquiry from the information institution and determining whether the user has authorization of purchasing the duty-free articles in accordance with the result of the inquiry; a unit for transmitting the credit information of the user to an approval center for credit inquiry via the network, receiving a result of the credit inquiry and determining whether the user is able to do credit transaction; and a unit for providing the client machine with the result of the credit inquiry in order to allow the authorized user to reconfirm a list of the ordered articles and to show a payment list in case that the user is authorized.

Also, the application further comprises a unit for issuing a receipt for the order and the payment; and a unit for storing the personal information and information related to the ordered article list and the payment list for shipping the ordered articles, and transmitting the information to the service center 17 via the network.

The client machines 13, 14 may be installed in an airport gate area, an airport terminal, a hotel, and etc. of each country, and the application for selling duty-free articles may be built in a computer of an airplane for sales promotion. Also, it is possible that a client accesses a site of the duty-free article shopping mall and the client purchases the articles with use of a mobile phone or a personal portable terminal through communication network such as internet.

Now, an embodiment of the duty-free article shopping mall operating method according to the present invention will be described in detail with reference to FIG. 1 and FIG. 2.

Referring to FIG. 2, the method includes first steps S20–S23 of introducing the duty-free article-related information or the service information supported by duty-free shops of numerous nations to the client machines connected with the server 12 through the network 11, and determining what kind of information is selected by the user; second steps S24–S27 of requiring the user to input the user information, and identifying and confirming the inputted user information in accordance with the result of the determination; and third steps S28–S30 of providing the selected duty-free article-related information or the service information in case that the user information is identified and confirmed, namely the user is authorized.

If the user tries to access the shopping mall site, the server 12 provides the client machines 13, 14 with the introduction information of the duty-free article shopping mall, namely menus of the duty-free article-related information and the service information stored in the introduction information database in the step S20.

In here, the duty-free article-related information comprises information related to allowance limit of each nation, the information comprising allowance limit of an amount of transaction, a list of restricted articles, a list of articles restricted according to incoming quantity and/or a list of special supervision articles by customs.

Also, the duty-free article-related information comprises price information based on a list of articles available in each airline and/or price information of each nation based on an itemized commodity list.

And the service information comprises information showing locations of duty-free shops and/or available shipping destinations according to each nation, refund information according to a customs system of the duty-free articles, a map of each international airport or an introduction about locally produced goods of each nation.

In addition, the service information may comprise gift information or advertisements, and show guidance for purchase, summary description of articles and payment methods.

The step S21 determining whether the user selects a desired information or inputs a desired search words. Then, the step S22 provides a web page having the corresponding information immediately in case that selected information is available for an unregistered user, or provides a notice page or announcement in case that the selected information is available only for a registered user. The sound processing as well as text processing or graphic processing can be used on notice page or announcement.

On the other hand, the server may require the user to input the user information in case that the selected information is available only for the registered user. The case that the user selects information related to ordering duty-free articles will be described exemplary in the below.

The server 12 determines whether the selected information is information of purchasing the duty-free articles S23. An order sheet includes articles to be purchased, quantity, shop, shipping destination and etc. If the selected information is information of purchasing the duty-free articles, the server requires the user to input personal information and credit information S24.

The server 12 then determines whether the personal information and the credit information of the user are inputted S25, and identifies and confirms whether the user is registered by comparing with the information in the registration information database S26. The personal information may be, for example, a serial number and term of validity of a passport, and etc. for proving the user's identity.

If the user is registered as a result of the step S26, the server (12) transmits the identified and confirmed personal information to the information institution for inquiry of exit and/or entry status of the user and comparing the personal information with a list of inbound and/or outbound passengers from the information institution via the network S26-1.

If the personal information of user is identified and confirmed, the server transmits the credit information to a settlement system in the step S27. The settlement system inquiries the credit information of the user on the basis of a pre-established blacklist of the users. The settlement system may be included by the server 12 or be established in the existing approval center 15 or the financial institution 16. Also the settlement system generates a payment list according to prices or quantity of the corresponding duty-free articles in case that the user is not included in the blacklist.

The step S28 allows the authorized user to reconfirm a list of the ordered articles and to confirm the payment list in accordance with a result of the credit inquiry of the user. And if the user agrees with the list, the server issues a receipt for the order and the payment.

And the step S29 transmits the personal information, information related to the ordered article list and the payment for shipping the ordered articles to the service center 17 via the network 11.

At last, the step S30 provides the client machine 13 or 14 with a message notifying completion of processing duty-free article order, and then ends. The steps S29 and S30 may be processed simultaneously or conversely.

In each step, the user can return back to an initial screen of the step S20 immediately if the user inputs a return key.

As described above, the duty-free article shopping mall is operated on computer network according to the present invention, and thereby duty-free article markets can be more broaden, and losses or troubles resulted from lack of information such as an allowance limit of each nation can be reduced.

Also, a client may compare price information of the duty-free articles of one nation with that of other nations so that the client may be provided with high quality services, and an operator may minimize unnecessary shipping costs and maximize selling commissions. Therefore the present invention helps to create profits of the client and the operator consequently.

The duty-free article shopping mall operating method and system according to the present invention have been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A duty-free article shopping mall operating method on a computer network interconnecting one or more client machines, an information institution for inquiry of exit and entry status and an approval center for credit inquiry with a server of a duty-free article shopping mall site, the operating method comprising the steps of:

(a) introducing duty-free article-related information or service information supported by duty-free shops of numerous nations to the client machine connected to the server through the network, and determining what kind of information is selected by user;

(b) requiring the user to input personal information and credit information when the user selects information for purchasing the duty-free articles, identifying and confirming the input information by comparing with registration information in the server and inquiring the input information via the network, and determining whether the user has authorization for purchasing the duty-free articles in accordance with exit and/or entry status and credit status of the user; and (c) providing the user having the authorization for purchasing the duty-free articles with the selected duty-free article-related information and/or service information.

2. The duty-free article shopping mall operating method as claimed in claim 1, wherein the step (b) comprises the steps of:

identifying and confirming the input personal information by comparing with the registration information in the server, transmitting the identified and confirmed personal information to the information institution for inquiry of exit and/or entry status of the user when the user is registered, and comparing the personal information with a list of inbound and/or outbound passengers from the information institution via the network;

transmitting the input credit information to the approval center for credit inquiry via the network when exit and/or entry of the user is confirmed; and allowing the authorized user to reconfirm a list of the ordered articles and to confirm a payment list in accordance with a result of the credit inquiry.

3. The duty-free article shopping mall operating method as claimed in claim 1, the step (c) further comprising the step of issuing a receipt for the order and the payment.

4. The duty-free article shopping mall operating method as claimed in claim 1, the step (c) further comprising the step of transmitting the personal information and information related to the order and the payment for shipping the ordered articles to a service center via the network.

5. The duty-free article shopping mall operating method as claimed in claim 1, wherein the duty-free article-related information in the step (a) comprises information related to allowance limit of each nation, the information comprising allowance limit of an amount of transaction, a list of restricted articles, a list of articles restricted according to incoming quantity and/or a list of special supervision articles by customs.

6. The duty-free article shopping mall operating method as claimed in claim 1, wherein the duty-free article-related information in the step (a) comprises price information based on a list of articles available in each airline and/or price information of each nation based on an itemized commodity list.

7. The duty-free article shopping mall operating method as claimed in claim 1, wherein the service information in the step (a) comprises information showing locations of duty-free shops and/or available shipping destinations according to each nation.

8. The duty-free article shopping mall operating method as claimed in claim 1, wherein the service information in the step (a) comprises customs refund information according to a customs system for the duty-free articles.

9. The duty-free article shopping mall operating method as claimed in claim 1, further comprising the step of:

(d) providing the user with the selected information immediately so that the selected information is available for both unregistered and registered users as a result of the determination in the step (a).

10. The duty-free article shopping mall operating method as in claim 1, wherein the computer network comprises the internet.

11. A duty-free article shopping mall operating system on a computer network connecting one or more client machines with a server of a duty-free article shopping mall site, wherein the server forms an introduction information database for introducing duty-free article-related information or service information supported by duty-free shops of numerous nations to the client machine through the network and a registration information database for determining whether a user is registered; and wherein the operating system determines what kind of information is selected by the user, requires the user to input personal information and credit information when the user selects information for purchasing the duty-free articles, identifies and confirms the input information by comparing with information in the registration information database and inquiring the input information via the network, determines whether the user has authorization for purchasing the duty-free articles in accordance with exit and/or entry status and credit status of the user, and provides the selected duty-free article-related information or service information when the user is authorized.

12. The duty-free article shopping mall operating system as claimed in claim 11, further comprising means for storing the personal information and information related to the ordered article list and the payment list for shipping the ordered articles, and transmitting the information to a service center via the network.

13. The duty-free article shopping mall operating system as claimed in claim 11, wherein the introduction information database comprises information related to allowance limits for each nation, the information comprising allowance limits for an amount of a transaction, a list of restricted articles, a list of articles restricted according to incoming quantity and/or a list of special supervision articles by customs.

14. The duty-free article shopping mall operating system as claimed in claim 11, wherein the introduction information database comprises price information based on a list of articles available in each airline and/or price information of each nation based on an itemized commodity list.

15. The duty-free article shopping mall operating system as claimed in claim 11, wherein the introduction information database comprises information showing locations of duty-free shops and/or available shipping destinations according to each nation.

16. The duty-free article shopping mall operating system as claimed in claim 11, wherein the introduction information database comprises customs refund information according to a customs system for the duty-free articles.

17. The duty-free article shopping mall operating system as claimed in claim 11, the operating system including:

means for identifying and confirming the user by comparing the input personal information of the user, selecting information for purchasing the duty-free articles, with information in the registration information database, transmitting the personal information of the registered user to an information institution for inquiry of exit and/or entry status, receiving the result of the inquiry from the information institution and determining whether the user has authorization for purchasing the duty-free articles in accordance with a result of the inquiry;

means for transmitting the credit information of the user to an approval center for credit inquiry via the network, receiving a result of the credit inquiry and determining whether the user is able to do a credit transaction; and means for providing the client machine with the result of the credit inquiry in order to allow the authorized user to confirm a list of the ordered articles and to show a payment list when the user is authorized.

18. The duty-free article shopping mall operating system as claimed in claim 17, further comprising means for issuing a receipt for the order and the payment.

19. The duty-free article shopping mall operating system as in claim 11, wherein the computer network comprises the internet.

20. A duty-free article shopping method over the internet including an information center for inquiring of exit and entry status of a user and an approval center for credit inquiry with a duty-free article shopping site, comprising the steps of:

providing duty-free article-related information from duty free shops of various selected nations in response to selections of a user;

requesting personal information and credit information from the user in order to authorize a purchase;

comparing the personal information and credit information of the user;

determining the exit and/or entry status of the user; and enabling the user to purchase selected duty-free articles in response to approval of 1) the personal information and credit information of the user and 2) the exit and/or entry status of the user.

* * * * *